United States Patent
Pradelles et al.

(10) Patent No.: US 9,908,487 B2
(45) Date of Patent: Mar. 6, 2018

(54) METHOD FOR ACQUIRING SIGNALS SUCH AS SIGNALS REPRESENTATIVE OF THE STATE OF CONTACTS OF A MOTOR VEHICLE

(71) Applicants: CONTINENTAL AUTOMOTIVE FRANCE, Toulouse (FR); CONTINENTAL AUTOMOTIVE GmbH, Hannover (DE)

(72) Inventors: Christophe Pradelles, Fiac (FR); Amar Lounnas, Noe (FR); Jean-Claude Prouvoyeur, Saint-Jean (FR)

(73) Assignees: CONTINENTAL AUTOMOTIVE FRANCE, Toulouse (FR); CONTINENTAL AUTOMOTIVE GMBH, Hannover (DE)

(*) Notice: Subject to any disclaimer, the term of this patent is extended or adjusted under 35 U.S.C. 154(b) by 261 days.

(21) Appl. No.: 14/817,495

(22) Filed: Aug. 4, 2015

(65) Prior Publication Data
US 2016/0039366 A1    Feb. 11, 2016

(30) Foreign Application Priority Data
Aug. 5, 2014    (FR) .................................... 14 57602

(51) Int. Cl.
*B60R 16/023*    (2006.01)
*B60R 16/03*    (2006.01)

(52) U.S. Cl.
CPC ........ *B60R 16/023* (2013.01); *B60R 16/0231* (2013.01); *B60R 16/03* (2013.01)

(58) Field of Classification Search
None
See application file for complete search history.

(56) References Cited

U.S. PATENT DOCUMENTS

| | | |
|---|---|---|
| 4,703,258 A | 10/1987 | Palesch |
| 6,469,629 B1 | 10/2002 | Campbell et al. |
| 2003/0090312 A1 | 5/2003 | Limbrunner |

(Continued)

FOREIGN PATENT DOCUMENTS

| | | |
|---|---|---|
| CN | 1300456 A | 6/2001 |
| CN | 103095102 A | 5/2013 |

(Continued)

OTHER PUBLICATIONS

French Search Report, dated Apr. 22, 2015, from corresponding French Application.

*Primary Examiner* — Jared Fureman
*Assistant Examiner* — Aqeel Bukhari
(74) *Attorney, Agent, or Firm* — Young & Thompson

(57) ABSTRACT

A method for acquiring signals such as signals representative of the state of contacts (C1-Cn) of a motor vehicle, on communication ports (P1-Pn), which can be configured either in input mode or in output mode, of an electronic unit (1), called a computer, of the motor vehicle, according to which method the signals are acquired periodically by the alternation of time intervals of acquisition of the signals with standby time intervals. This method consists in configuring each communication port (P1-Pn) in input mode during the acquisition time intervals, and in level 0 output mode during the standby time intervals.

6 Claims, 4 Drawing Sheets

(56) References Cited

U.S. PATENT DOCUMENTS

2009/0091374 A1\* 4/2009 Dang Van Nhan ..... B60R 16/03
                                                        327/526
2014/0358364 A1   12/2014 Prouvoyeur et al.
2016/0239351 A1\* 8/2016 Jiang ........................ G06F 8/52

FOREIGN PATENT DOCUMENTS

| | | |
|---|---|---|
| DE | 40 15 271 A1 | 11/1991 |
| EP | 1 100 100 A1 | 5/2001 |
| EP | 1 712 424 A2 | 10/2006 |
| FR | 3 006 462 A1 | 12/2014 |
| JP | 6221341 A | 1/1987 |
| JP | 2645548 B2 | 5/1997 |
| JP | 2004-197602 A | 7/2004 |
| WO | 00/05104 A1 | 2/2000 |
| WO | 2014/044354 A1 | 3/2014 |

\* cited by examiner

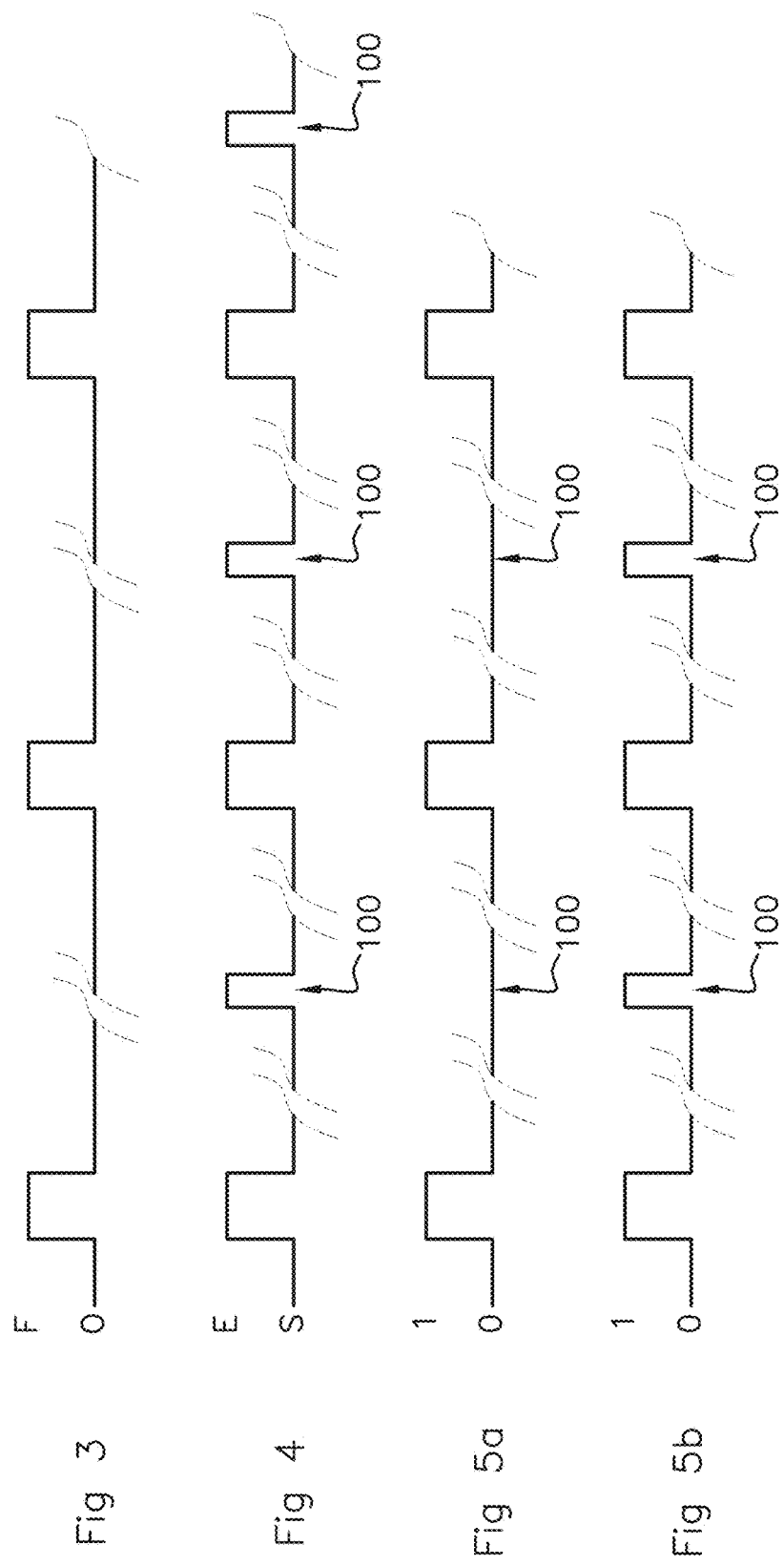

METHOD FOR ACQUIRING SIGNALS SUCH AS SIGNALS REPRESENTATIVE OF THE STATE OF CONTACTS OF A MOTOR VEHICLE

FIELD OF THE INVENTION

The invention relates to a method for acquiring signals such as signals representative of the state of contacts of a motor vehicle, on communication ports of an electronic unit or computer of the motor vehicle.

BACKGROUND OF THE INVENTION

Present-day motor vehicles are designed so that, regardless of the operating mode of the vehicle, which may be the parking mode with the engine switched off or the movement mode with the engine running, it is possible to check the open or closed state of a plurality of contacts such as a door closure contact, a trunk closure contact, a headlight activation lever contact, a windshield wiper activation lever contact, and the like.

To this end, motor vehicles are fitted with an electronic unit or computer comprising:
- a microcontroller having a plurality of communication ports and programmed to control the periodic acquisition of signals representative of the state of contacts, by alternating time intervals of acquisition of said signals with standby time intervals,
- an electrical circuit for supplying power to each of the contacts and for connecting each of said contacts to a communication port.

The disadvantage of this acquisition method lies in the potential harmful consequences that may be caused by the occurrence of an electrical fault of the short-circuit type.

This is because an electrical fault at one of the contacts causes an electric current to be injected into each of the communication ports of the microcontroller. In the acquisition time intervals, this current generated by the electrical fault is usually found to be less than the current consumed by the microcontroller, so that the microcontroller is not affected by the electrical faults.

On the other hand, notably in the case of the latest generation of vehicles in which the computer's power consumption in parking mode is very low, notably in order to prevent battery discharge, the current generated by an electrical fault may exceed the amount of current consumed by the computer, resulting in damage to the electronic components of the computer.

At the present time, the only solution proposed for overcoming this drawback is that of providing the computer with components capable of blocking the current generated by electrical faults that may occur. However, this solution tends to complicate the design of the computer and entails additional manufacturing costs.

SUMMARY OF THE INVENTION

The present invention is intended to overcome this drawback and has the main object of providing a method for acquiring signals representative of the state of contacts which, without requiring any additional components, can give protection against any damage that may affect a computer connected to these contacts if an electrical fault occurs.

Another object of the invention is to provide an acquisition method enabling the occurrence of an electrical fault to be diagnosed.

To this end, the invention proposes a method for acquiring signals such as signals representative of the state of contacts of a motor vehicle, on communication ports, which can be configured either in input mode or in output mode, of an electronic unit, called a computer, of the motor vehicle, according to which method the signals are acquired periodically by the alternation of time intervals of acquisition of said signals with standby time intervals.

According to the invention, this method is characterized in that each communication port is configured in input mode during the acquisition time intervals, and in zero level output mode during the standby time intervals.

Thus, according to this method, in each standby time interval the communication ports are switched to zero level output mode, so that any current injected into these communication ports, such as, notably, a current generated by an electrical fault, flows toward the electrical ground of the motor vehicle.

Consequently, according to the invention, any risk of damage to the electronic components of the computer is avoided, simply by accompanying the switching between the alternating acquisition and standby conditions with commands for switching each communication port between its input mode and its zero level output mode.

This solution is therefore applicable to any computer which has, in the usual way, communication ports which can be configured in input mode and output mode, such as, advantageously, communication ports comprising output modules of the "push-pull" type, and this solution requires no structural modification of these computers.

According to an advantageous embodiment of the invention, the contacts are supplied with power by means of an electrical circuit which:
- comprises a master switch that can be switched between a closed state corresponding to the acquisition time intervals and an open state corresponding to the standby time intervals,
- and is adapted so that, during the standby time intervals, the signal delivered by each contact to the associated communication port has different values according to whether an operating fault of the short-circuit type is or is not present.

In this case, additionally, and according to the invention, in each standby time interval at least one communication port is switched, during a fraction of said standby time interval, from its output mode to its input mode, and the value of the signal delivered to said communication port is acquired during this fraction of the standby time interval.

Thus, by reading the value of the signal received during the fraction of the standby time in which the communication port is in input mode, it is possible to ascertain the absence or presence of an electrical fault.

For the purpose of confirming the presence of an electrical fault, the existence of such a fault can also be determined solely after the reading of a sequence of identical values of the signals measured during the subsequent standby time intervals.

Advantageously, an example of an electrical installation for the use of this diagnostic procedure is one in which, on the one hand, each contact is connected to the ground of the motor vehicle, and, on the other hand, the master switch of the electrical circuit is connected to a voltage source such as a battery of said motor vehicle.

BRIEF DESCRIPTION OF THE DRAWINGS

Other characteristic objects and advantages of the invention will be evident from the following detailed description which refers to the attached drawings which represent two advantageous embodiments of the invention by way of non-limiting example. In these drawings:

FIG. 3 is a graphic representation of the successive states of the master switch of the electrical circuit for supplying power to the contacts, FIG. 4 is a graphic representation of the successive input and output modes of the communication ports of the microcontroller of the computer, FIG. 5a is a graphic representation of the signal delivered to a communication port in the absence of an operating fault of the short-circuit type, FIG. 5b is a graphic representation of the signal delivered to a communication port in the presence of an operating fault of the short-circuit type.

DETAILED DESCRIPTION OF THE INVENTION

Figure 1:
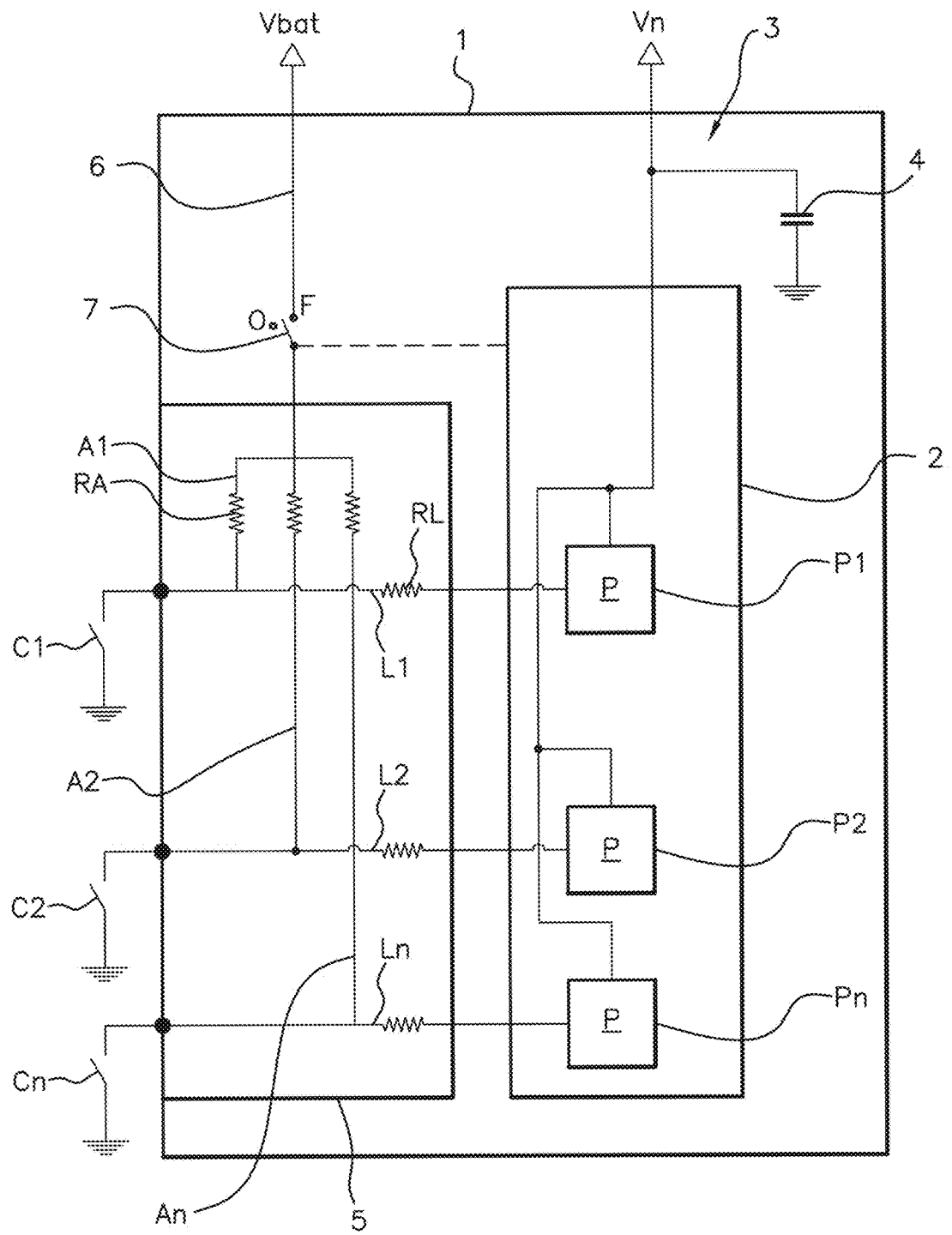
FIG. 1 is a schematic representation of a first example of a device according to the invention for acquiring signals representative of the state of contacts.
Figure 6:
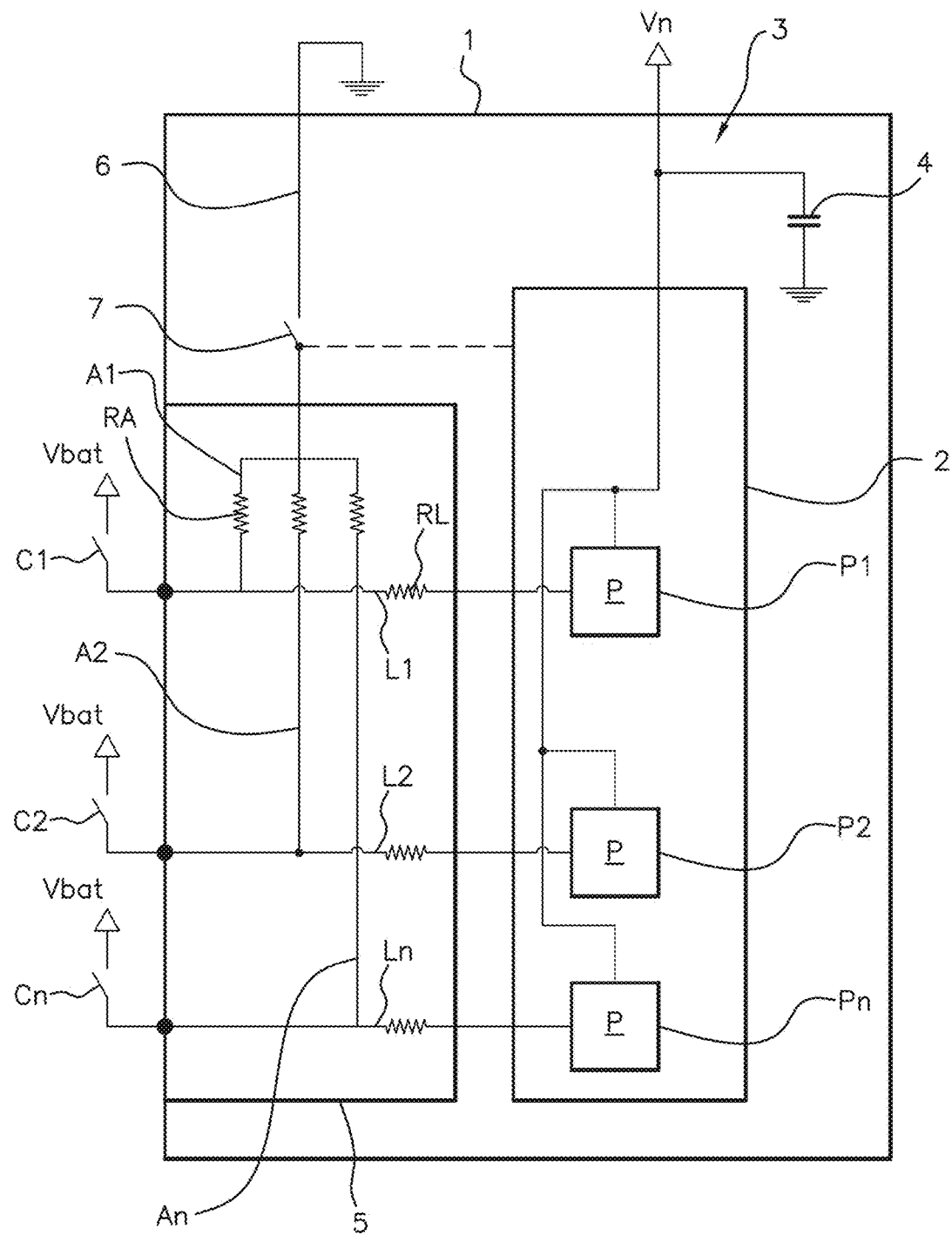
FIG. 6 is a schematic representation of a second example of a device according to the invention for acquiring signals representative of the state of contacts.

The devices represented schematically in FIGS. 1 and 6 consist of devices for acquiring signals representative of the state of a plurality of contacts C1-Cn.

These devices consist of a computer 1 comprising, in the first place, a microcontroller 2 having a plurality of communication ports P1-Pn, and being connected to a voltage source Vn by a power supply circuit 3 having a power supply buffer capacitor 4.

This computer 1 also comprises an electrical circuit 5 for supplying power to each contact C1-Cn and for connecting each of said contacts to one of the communication ports P1-Pn, and a branch 6 for connecting said electrical circuit to a voltage source Vbat, in which is interposed a master switch 7, the switching of which between its closed state (F) and its open state (O) is controlled by the microcontroller 2.

The electrical circuit 5 comprises, in the first place, a plurality of branches A1-An for supplying, respectively, each of the contacts C1-Cn, which in this embodiment are connected to the ground, an electrical resistance such as RA being interposed in each of these branches.

This electrical circuit 5 also comprises a plurality of branches L1-Ln for connecting each communication port P1-Pn to a supply branch A1-An, at a connection point of said supply branch located downstream of the resistance RA.

Additionally, an electrical resistance RL is interposed in each of the connecting branches L1-LN. The resistances RL also have a higher value than the resistances RA, so as to limit the intensity of the current received by each communication port P1-Pn.

Figure 2:
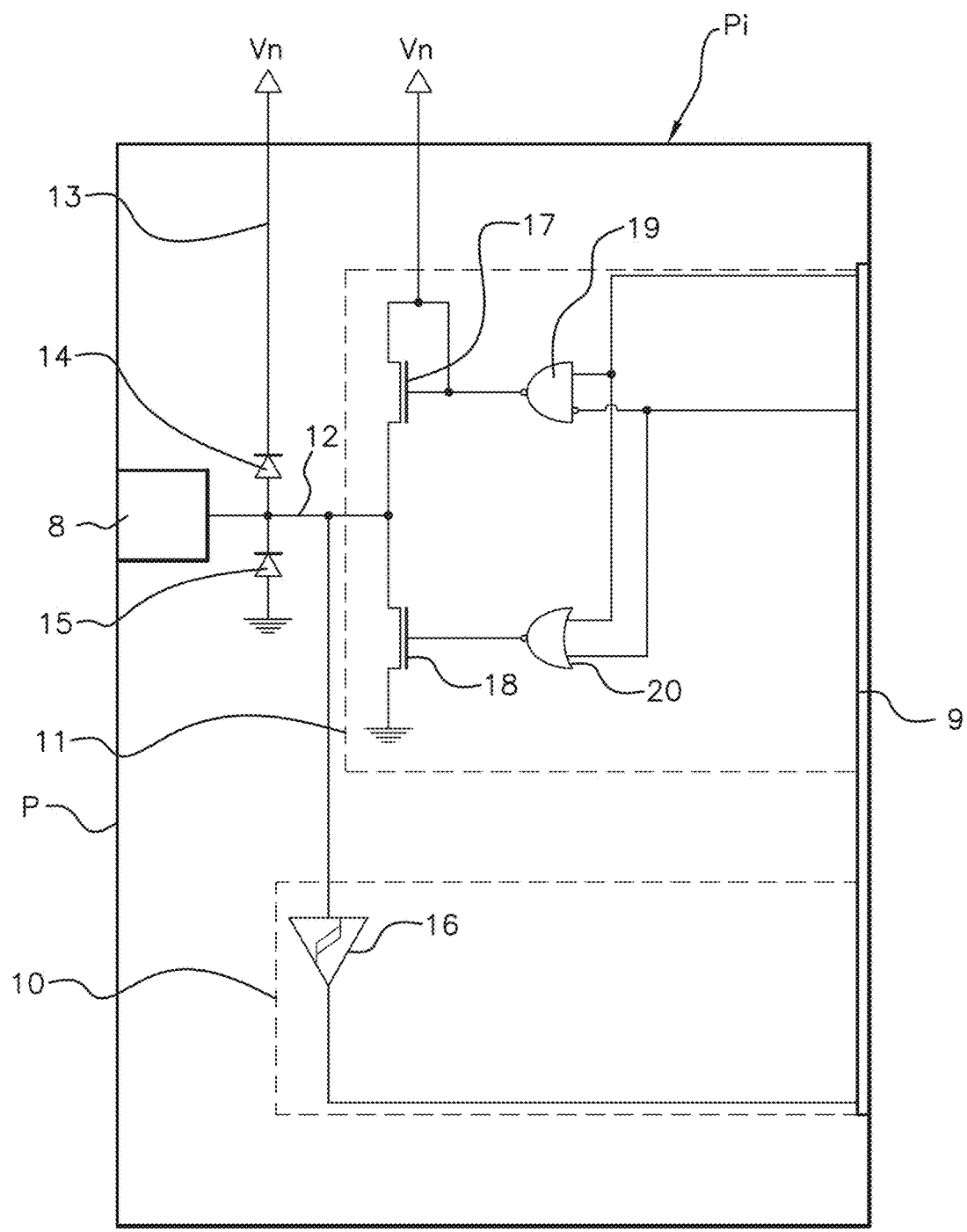
FIG. 2 is a schematic representation of one of the communication ports of the microcontroller of this acquisition device.

Furthermore, as shown in FIG. 2, each communication port Pi of the ports P1-Pn has a pin 8 for connection to a connecting branch L1-Ln of the electrical circuit 5, registers 9, and an input module 10 and an output module 11 fitted between said pin and registers.

These two modules 10, 11 are connected to the pin 8 by a single connecting branch 12, to which is connected a branch 13 comprising, on either side of said connecting branch, a first diode 14 connected to a voltage source Vn and a second diode 15 connected to the ground.

The input module 10 also incorporates a Schmitt trigger 16.

As regards the output module 11, this consists of a module of the "push-pull" type, and incorporates two complementary transistors 17, 18, which are connected, on the one hand, to a voltage source Vn and to the ground respectively, and, on the other hand, to the registers 9 via control lines comprising, respectively, a NAND gate 19 and a NOR gate 20.

This output module 11 is conventionally adapted so that the two transistors 17, 18 are systematically inverted, and allow the pin 8 to be brought either to a zero voltage (zero level output mode) or to a potential of Vn volts (level 1 output mode).

As shown in FIG. 3, and primarily for the purpose of acquiring signals representative of the state of the contacts C1-Cn, the microcontroller 2 is programmed to control the switching of the master switch 7 between its closed state (position F), corresponding to signal acquisition time intervals, and its open state (position O), corresponding to the standby time intervals.

At the same time, as shown in FIG. 4, the input module 10 and output module 11 of each communication port P1-Pn are controlled so that each of said ports is configured:
  in input mode (position E) during the acquisition time intervals, that is to say in the closed state of the master switch 7, and
  in zero level output mode (position S) during the standby time intervals, that is to say in the open state of the master switch 7, except during a fraction of this time interval (referenced as 100 in FIG. 4) in which said communication port is configured in input mode.

FIG. 5a shows the variation of the signal delivered to a communication port Pi in the absence of an operating fault of the short-circuit type, during a period in which the associated contact Ci has not been subject to any closure during the acquisition time intervals. It can be seen from this variation that:
  during the acquisition time intervals, the received signal is at its level 1, representative of an open state of the contact Ci,
  in the momentary configuration of the communication port Pi in input mode during the standby time interval (with the master switch 7 open), the received signal remains at the zero level, representative of an absence of an operating fault of the short-circuit type.

FIG. 5b, for its part, shows the variation of the signal delivered to a communication port Pi in the presence of an operating fault, during a period in which the associated contact Ci has not been subject to any closure during the acquisition time intervals. It can be seen from this variation that:
  during the acquisition time intervals, the received signal is at its level 1, representative of an open state of the contact Ci,
  in the momentary configuration of the communication port Pi in input mode during the standby time interval (with the master switch 7 open), the received signal is at its level 1, representative of the existence of an operating fault of the short-circuit type.

It should be noted that the diagnosis concerning the existence of an electrical fault may be false, if the contact Ci unfortunately happens to be closed during the momentary configuration 100 of the communication port Pi in input mode in the standby time interval. However, since this closure can only be momentary (unless it is due to a malfunction detected by other means), the diagnosis is bound to be corrected in the course of the subsequent alternations.

It should also be noted that, if the contact Ci is closed during one of the acquisition time intervals, this closure is signaled and detected by a fall to zero level of the signal received by the communication port Pi.

FIG. 6 shows a variant embodiment of the acquisition device comprising a computer 1 strictly identical to that described above, but differing from the latter in that:

the contacts C1-Cn are connected to the voltage source Vbat, the power supply branch 6 is connected to the ground.

The acquisition process used for this embodiment is identical to that described above, and also results in the determination of the state of the contacts C1-Cn and in the provision of a diagnosis regarding the possible existence of an electrical fault.

The method according to the invention, executed, notably, by means of a computer 1 as described above, therefore results in the determination of the state of the contacts and in the provision of a diagnosis regarding the possible existence of an electrical fault, while providing protection against any damage that may affect a computer connected to these contacts if an electrical fault occurs.

The invention claimed is:

1. A method for acquiring signals such as signals representative of the state of contacts (C1-Cn) of a motor vehicle, on communication ports (P1-Pn), which can be configured either in input mode or in output mode, of an electronic unit (1), called a computer, of the motor vehicle, the method comprising:

periodically acquiring the signals by alternation of time intervals of acquisition of said signals with standby time intervals, including configuring each communication port (P1-Pn) in input mode during the acquisition time intervals, and configuring each communication port (P1-Pn) in zero level output mode during the standby time intervals.

2. The acquisition method as claimed in claim 1, wherein the contacts (C1-Cn) are supplied with power by means of an electrical circuit (5) which:

comprises a master switch (7) that can be switched between a closed state corresponding to the acquisition time intervals and an open state corresponding to the standby time intervals, and is adapted so that, during the standby time intervals, the signal delivered by each contact (C1-Cn) to the associated communication port (P1-Pn) has different values according to whether an operating fault of the short-circuit type is or is not present, wherein in each standby time interval, at least one communication port (P1-Pn) is switched, during a fraction (100) of said standby time interval, from its output mode to its input mode, and the value of the signal delivered to said communication port is acquired during this fraction of the standby time interval.

3. The acquisition method as claimed in claim 2, wherein each contact (C1-Cn) is connected to the ground of the motor vehicle, and the master switch (7) of the electrical circuit (5) is connected to a voltage source Vbat such as a battery of said motor vehicle.

4. The acquisition method as claimed in claim 1, wherein communication ports (P1-Pn) comprising output modules (11) of the "push-pull" type are used.

5. The acquisition method as claimed in claim 2, wherein communication ports (P1-Pn) comprising output modules (11) of the "push-pull" type are used.

6. The acquisition method as claimed in claim 3, wherein communication ports (P1-Pn) comprising output modules (11) of the "push-pull" type are used.

* * * * *